US005375769A

United States Patent [19]

Schultz

[11] Patent Number: 5,375,769

[45] Date of Patent: Dec. 27, 1994

[54] MIXING AND DISPENSING SPRAYER APPARATUS

[76] Inventor: Abraham Y. Schultz, 14101 Baywood Villages Dr., Chesterfield, Mo. 63017

[21] Appl. No.: 206,247

[22] Filed: Mar. 3, 1994

Related U.S. Application Data

[63] Continuation of Ser. No. 928,795, Aug. 12, 1992, abandoned.

[51] Int. Cl.[5] .......................... A01G 25/14; B05B 7/28

[52] U.S. Cl. ..................................... 239/310; 239/375

[58] Field of Search ..................................... 239/8-10, 239/310, 318, 375, 434, 340

[56] References Cited

U.S. PATENT DOCUMENTS

| | | | |
|---|---|---|---|
| 1,296,505 | 3/1919 | Hansen | 239/303 |
| 1,769,266 | 7/1930 | Lusier . | |
| 2,536,361 | 1/1951 | Flanders . | |
| 2,704,206 | 3/1955 | Crook . | |
| 3,032,275 | 5/1962 | Schneider | 239/318 |
| 3,037,708 | 6/1962 | Schneider et al. | 239/318 |
| 3,091,402 | 5/1963 | Palmer . | |
| 3,096,946 | 7/1963 | Schweiter | 239/590 X |
| 3,260,464 | 7/1966 | Harant . | |
| 3,323,685 | 6/1967 | Schultz | 239/318 |

FOREIGN PATENT DOCUMENTS

| | | | |
|---|---|---|---|
| 2486827 | 1/1982 | France | 239/318 |
| 1941772 | 2/1971 | Germany | 239/310 |
| 800279 | 8/1958 | United Kingdom | 239/318 |
| WO926788 | 4/1992 | WIPO | 239/590 |

OTHER PUBLICATIONS

Modern Plastics Encyclopedia article "Extrusion Blow-Molding" by M. E. Bailey, pp. 238-239, 1980-1981.

*Primary Examiner*—Andres Kashnikow
*Assistant Examiner*—Kevin P. Weldon
*Attorney, Agent, or Firm*—Rogers, Howell & Haferkamp

[57] ABSTRACT

A mixing and dispensing sprayer apparatus is comprised of a bottle or container and a nozzle assembly where a fluid passed through the nozzle assembly mixes with a material contained in the container and the mixture of fluid and material then passes from the container back into the fluid flow through the nozzle assembly and exits the nozzle assembly as a spray. The container and nozzle assembly are molded as a single unit of a plastic material by a blow molding process. A hollow interior volume of the container communicates with a fluid conducting channel of the nozzle assembly through one or more ports formed in the apparatus. The nozzle assembly of the apparatus has an orifice formed therein that directs a portion of fluid flowing through the nozzle assembly into the container interior where the fluid is mixed with a material contained in the container, such as a particulate, liquid or soluble material, and the mixture of fluid and material then passes back through the port into the channel of the nozzle assembly where it is mixed with fluid passing through the channel and exits the nozzle assembly as a spray.

22 Claims, 3 Drawing Sheets

MIXING AND DISPENSING SPRAYER APPARATUS

This application is a continuation of U.S. application Ser. No. 07/928,795, filed Aug. 12, 1992, and now abandoned.

BACKGROUND OF THE INVENTION

1. Field of the Invention

The present invention pertains to a mixing and dispensing sprayer apparatus comprising a bottle or container and a nozzle assembly, where a portion of a fluid passed through the nozzle assembly is diverted into the container and is mixed with a material contained in the container, and then the mixture of the fluid and the material passes from the container back into the flow of fluid passing through the nozzle assembly and exits the nozzle assembly with the fluid as a spray.

2. Description of the Related Art

Typical examples of prior art mixing devices are disclosed in U.S. Pat. Nos. 2,536,361 and 3,323,685. The mixing and dispensing sprayer apparatus of the present invention comprises several improvements over prior art mixing devices of these types.

The typical prior art mixing device for sprays is comprised of two parts, a container and a sprayer head or nozzle. The sprayer head is usually attached over an opening in the container by an internally threaded removable cap. The cap, together with the sprayer head, is removable from the container opening to enable a supply of material to be dispensed by the device to be added to the container interior. The sprayer head has a fluid passage extending across the container opening. A port extends from the sprayer head fluid passage and exits the sprayer head at a position where it is confined by the screw threaded cap. The port provides fluid communication between the fluid passage of the sprayer head and the interior volume of the container when the sprayer head is attached to the container opening by the cap.

The sprayer head is provided with some type of connector at an upstream or inlet end of the sprayer head for attaching the sprayer head to a hose or other source of fluid. A deflecting wall or baffle is formed in the fluid passage. The baffle causes a portion of the fluid directed through the fluid passage to be deflected through the port and into the interior of the container. The remainder of the fluid passes through an orifice formed by the baffle and across the port, and exits the sprayer head at a downstream end of the fluid passage.

The deflected portion of fluid circulates in the container interior and mixes with the material to be dispensed contained therein. The material mixed with the fluid rises to the top of the container and passes with the fluid through the port and out of the container into the flow of fluid passing through the sprayer head passage with which it exits the sprayer head as a spray.

Mixing devices of this type are used in a variety of applications including spraying seeds or fertilizer, or both, over lawns and dispensing soap or detergents, all of which typically include a liquid as the fluid carrying and dispensing the materials contained in the sprayer container. Additional uses include the dispensing of powders, such as insect repellent dust, dispensing of dry seeds, or other finely divided or particulate materials, all of which typically employ compressed air as the fluid for carrying and dispensing the materials.

Prior art mixing devices for sprays have been found to be relatively expensive to manufacture and at times are difficult to operate. Prior art mixing devices for sprays, when reduced to their basic component parts, are comprised of a separate container and sprayer head that are screwed together. The sprayer head and container are often comprised of separate parts that are formed by injection molding, and are then secured together to form the sprayer head and container. The sprayer head and container are then screwed together to complete the assembly of the prior art device. Alternatively, the container alone may be formed by blow molding with the spray head being formed by injection molding. Again, these separate parts are then screwed together to complete the assembly of the device. These manufacturing processes require a number of separate molds to construct each of the component parts, and involve a number of manufacturing steps to produce the final devices. Each of these adds to the overall expense involved in producing the prior art mixing devices for sprays.

Prior art mixing devices for sprays have also been found to be awkward to use. The difficulty in using prior art mixing devices most often results from their not being constructed with a distinct handle, and from the attachment of the container to the sprayer head at the access opening of the container. In the absence of a handle, the sprayer head or container must be gripped to hold the prior art device. The removable connection of the sprayer head to the container requires the container to be separated from the sprayer head each time it is necessary to add more material to be dispensed to the container interior. With the sprayer head attached to a garden hose or other source of carrier fluid, it is difficult to unscrew the container from the sprayer head and often the container is dropped by the user of the device as the container is unscrewed. The construction of prior art mixing devices not only makes their use difficult and awkward, but when the container is constructed of glass or other fragile materials, dropping the container as it is unscrewed from the sprayer head can result in the breakage of the container.

It is an object of the present invention to overcome the disadvantages associated with prior art mixing devices for sprays by providing an improved mixing and dispensing sprayer apparatus that is relatively inexpensive to manufacture and is much easier to use than prior art devices. It is an object of the present invention to provide an improved mixing and dispensing sprayer apparatus that is comprised of a container and a nozzle assembly that are formed together unitarily as by an inexpensive blow molding process. It is also an object of the present invention to provide an improved sprayer apparatus having an access opening to the container that is separated from the nozzle assembly, enabling materials to be added to the container interior without separating the container from the nozzle assembly. It is also an object of the present invention to provide an improved sprayer apparatus having a container with an interior wall configured to enhance the ability of the apparatus to regulate the amount of material mixed with the carrier fluid as the fluid is passed through the apparatus.

A still further object of the invention is to provide an improved sprayer apparatus wherein the configuration of the unitary connection of the container and nozzle assembly of the apparatus provides a handle that enables the apparatus to be easily gripped and manipulated by a user of the apparatus.

Other objects of the invention will be apparent from the following description of the invention and drawing figures.

SUMMARY OF THE INVENTION

The mixing and dispensing sprayer apparatus of the present invention is basically comprised of a container molded integrally with a nozzle assembly as a single unit. In the preferred embodiment of the invention, the container and nozzle assembly are constructed of a plastic material and are made unitarily together by being formed simultaneously in a blow molding process. However, other conventional methods of forming the mixing and dispensing apparatus of the present invention may be employed, and other types of materials may be employed in the construction of the apparatus.

The container of the apparatus has a bottom wall and sidewalls that may be formed in a variety of different configurations. The interior of the bottom wall of the container has a plurality of depressions formed therein. The depressions form a plurality of retainer cells that retain the material to be dispensed by the fluid passed through the apparatus and slow the rate of depletion of the material from the container. The depressions may also be formed in the interior of the sidewall of the container and the cells formed by the depressions may have a variety of configurations and may be arranged in a variety of patterns.

An access opening is provided on the container. A cap is secured over the openings and is easily removed to enable a supply of material to be dispensed by the apparatus to be added to the container interior. The opening may be located at any conveniently accessible area of the apparatus.

In one embodiment of the invention, a pair of separate hollow handle members project upwardly from the container. Each of the handle members has a slight curvature with concave sides of each handle member opposing each other. A void or opening is left between the pair of handle members and between the container and nozzle assembly. The void is sufficiently dimensioned to enable the fingers of a user of the apparatus to be inserted through the void when gripping either of the handle members or the nozzle assembly.

The nozzle assembly of the apparatus connects the top most ends of the pair of container handle members. The nozzle assembly has a generally tubular configuration with opposite inlet and outlet ends and a fluid conducting channel extending through the interior of the nozzle assembly between its inlet and outlet ends.

A threaded or other connector is provided at the inlet end of the nozzle assembly. The connector may be employed in connecting the nozzle assembly to a source of fluid pressure such as a garden hose, or some other source of fluid pressure. A stopcock valve may also be provided at the inlet end of the nozzle assembly intermediate the fluid conducting channel of the assembly and the connector.

As the fluid conducting channel extends in a downstream direction of fluid flow from the inlet end to the outlet end of the assembly, a portion of the channel interior wall converges toward an opposite portion of the channel interior wall to a position slightly spaced from the opposite wall. This convergence of the channel walls forms an orifice in the channel. As the channel extends downstream from the orifice to the outlet end of the nozzle assembly, the interior wall portions diverge away from each other. As the channel walls extend downstream from the orifice they may be angled slightly upward, downward, or to one side to produce a wider, narrower, or other configuration of desired spray of fluid exiting the channel at the outlet end.

A port is provided through the interior wall of the nozzle assembly just downstream from the orifice. The forward most handle member is connected to the underside of the nozzle assembly exterior at the position of the port. The port extends through the bottom wall and into the interior of the forward most handle member providing fluid communication between the channel and the interior volume of the handle member and the container.

In an alternate embodiment, a second port is provided through the interior wall of the nozzle assembly upstream from the orifice. The rearward most handle member is connected to the underside of the nozzle assembly exterior at the position of the second port. The second port extends through the bottom wall of the nozzle assembly into the interior volume of the second handle member providing fluid communication between the channel and the interior of the second handle member and the container.

The unique configuration and construction of the mixing and dispensing sprayer apparatus of the present invention enables it to be formed by a blow molding process with the nozzle assembly connected unitarily with the container. The blow molding process enables the apparatus to be manufactured at less cost than if it were formed by an injection molding or other process, and also enables the apparatus to be produced in less time than in an injection molding or other process, resulting in greater production of the apparatus at less cost than would be available in producing conventional mixing and spraying devices by other processes.

BRIEF DESCRIPTION OF THE DRAWINGS

Further objects and features of the present invention are revealed in the following detailed description of the invention and in the drawing figures wherein.

DETAILED DESCRIPTION OF THE PREFERRED EMBODIMENTS

The mixing and dispensing sprayer apparatus 10 of the present invention has a unique configuration that enables the preferred embodiment of the apparatus to be manufactured inexpensively by a blow molding process. Although the configuration of the apparatus and its method of manufacture are unique to mixing and spraying devices, the operation of the apparatus of the invention remains similar to the operation of mixing and spraying devices such as that disclosed in U.S. Pat. No. 3,323,685.

Figure 1:
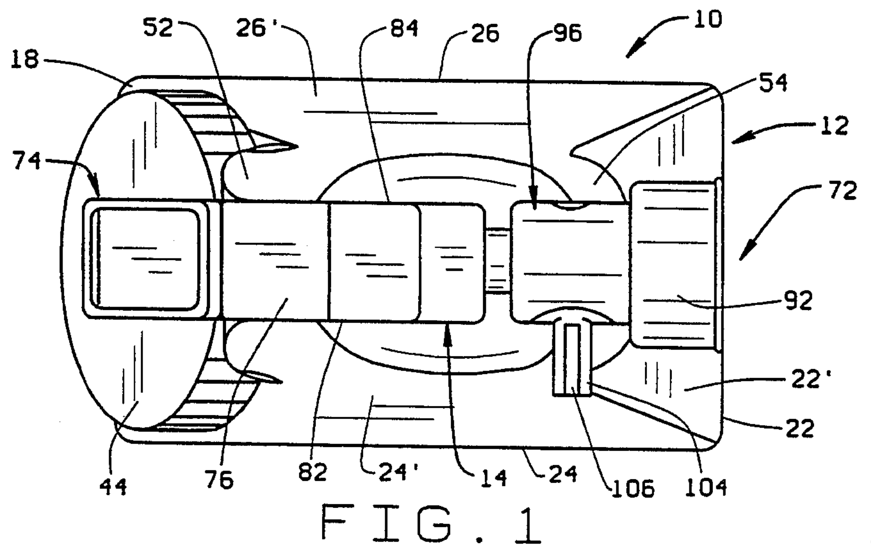
FIG. 1 shows a top plan view of the mixing and dispensing apparatus of the present invention.
Figure 2:
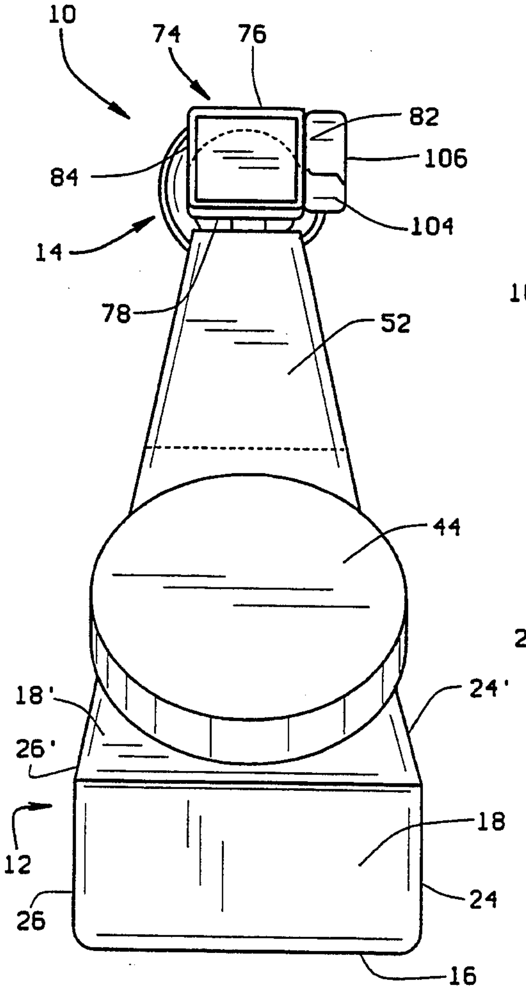
FIG. 2 shows a front elevation view of the apparatus of the invention.
Figure 3:
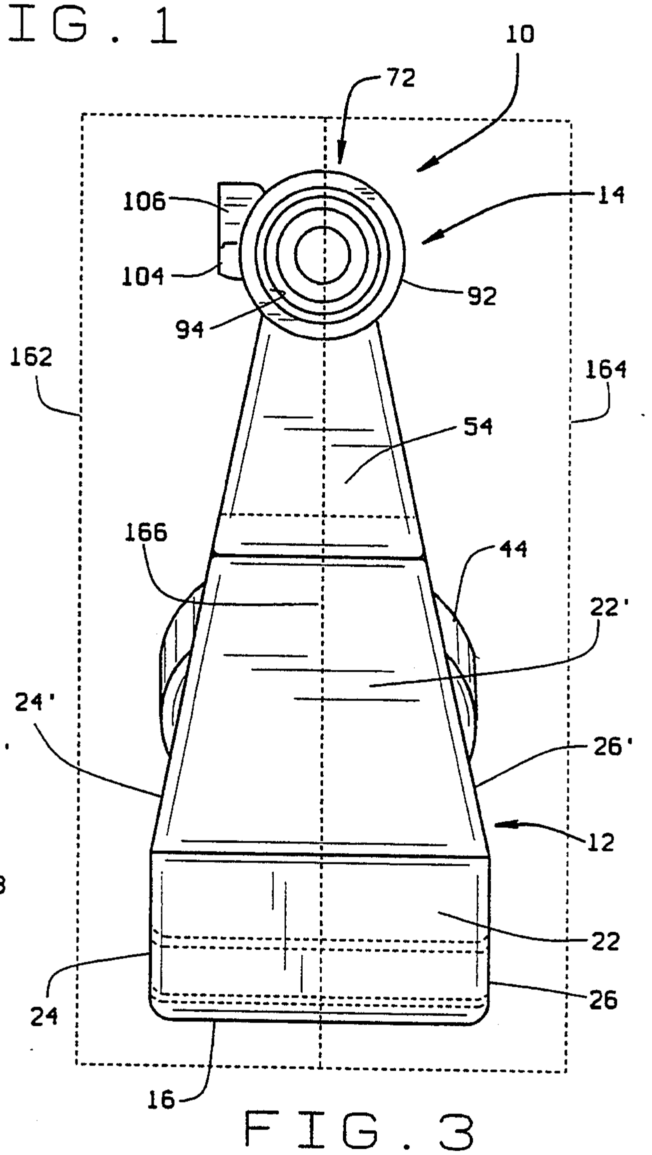
FIG. 3 shows a rear elevation view of the apparatus of the invention.

Top, front and back views of a first embodiment of the mixing and dispensing sprayer apparatus 10 of the present invention are shown in FIGS. 1–3. As seen in the drawing figures, the apparatus 10 is generally constructed of a hollow container 12 and a nozzle assembly 14. In the preferred embodiment of the invention both the container and nozzle assembly are constructed entirely of a plastic material, and are formed together unitarily in a blow molding process as will be explained. However, the container and nozzle assembly of the apparatus may be constructed of other types of materials and by other known processes.

In the description to follow, the container 12 and nozzle 14 are described as having a general rectangular configuration and a general rectangular, tubular configuration, respectively. It should be understood that the general configurations of the container and nozzle assembly shown and described are illustrative only and are not intended to be limiting. The container and nozzle assembly may have a variety of other configurations such as circular, cylindrical, etc., without effecting the intended scope of the invention as defined in the claims.

Figure 4:
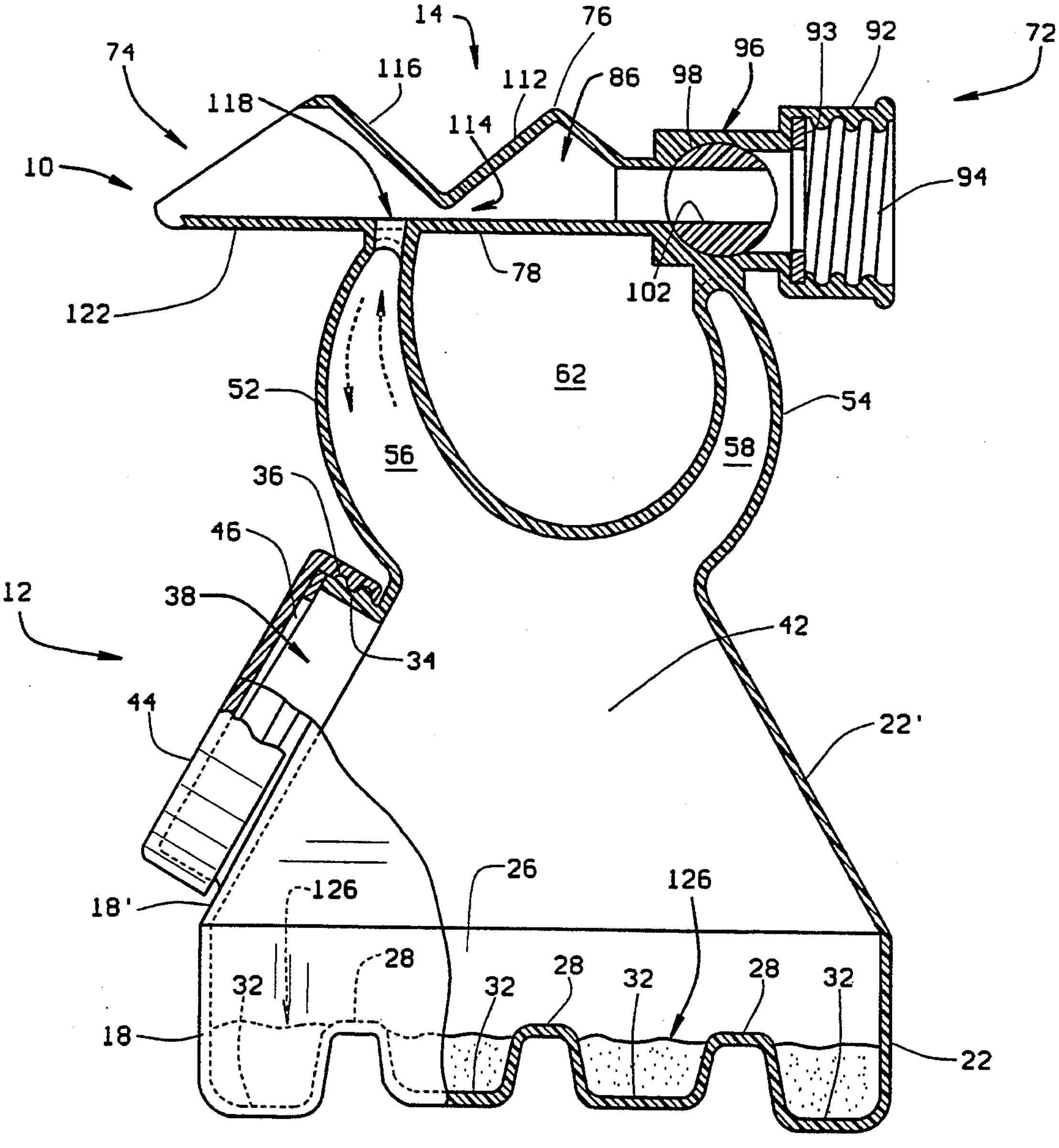
FIG. 4 shows a side elevation view, partially in section, of the apparatus of the invention.

The container bottom is formed with a bottom wall 16, a front wall 18, a back wall 22, and opposed sidewalls 24, 26. As seen in the drawing figures, the bottom wall, front and back walls, and sidewalls are arranged in a general rectangular configuration. As is best seen in FIG. 4, the container bottom wall 16 is formed with a plurality of cellular depressions that are defined by ridges 28 and troughs 32. The ridges 28 extend upward into the interior volume of the container and extend transversely across the bottom wall 16 between the left and right sidewalls 24, 26 of the container. The troughs 32 also extend transversely across the bottom wall 16 between the left and right sidewalls 24, 26. As seen in FIG. 4, the troughs and ridges are arranged substantially parallel to each other in an alternating sequence from the front wall 18 to the back wall 22 of the container. Although troughs are shown, the cellular depressions can have a variety of configurations such as circular depressions. Moreover, the cells formed by the depressions are not limited to the bottom wall but may be formed in one or more of the sidewalls. It is only necessary that the configuration of the cells contain a certain amount of the material to be dispensed in order to regulate the rate of dispersion of the material. Cells of a variety of configurations can serve this purpose without departing from the intended scope of the invention defined in the claims.

Upper portions of the container front wall 18', back wall 22', left sidewall 24' and right sidewall 26' taper toward each other as they extend upward from the bottom of the container. This tapering configuration of the container walls is best seen in FIGS. 2–4. A cylindrical neck 34 is formed in the tapering portion of the container front wall 18' and a spiralling screw thread 36 is formed over its exterior surface. The neck 34 surrounds an opening 38 that provides access to the container interior volume 42. A circular cap 44 is screw threaded over the threads 36 of the neck 34 to close the opening 38 of the container. Alternatively, the opening could be provided with a snap on cap or some other equivalent type of closure. An annular sealing ring 46 is positioned in the interior of the cap 44 and provides a fluid tight seal over the container opening 38 when the cap 44 is screw threaded over the neck 34. The interior 42 of the container is easily accessed by unscrewing the cap 44 from the container neck 34. Again, it is not necessary that the container have a tapered configuration and the particular configuration described is only illustrative.

As the top portions of the four container walls 18', 22', 24', 26' taper upward toward each other they merge into a pair of hollow handle members 52, 54 forming a handle at the top most end of the container. As seen in FIG. 4, the forward most handle member 52 has a hollow interior 56 that communicates with the interior 42 of the container, and the rearward most handle member 54 also has a hollow interior 58 that communicates with the container interior 42. The forward and rearward handle members 52, 54 are formed having a curved configuration with concave surfaces of each of the handle members mutually opposing each other. The forward and rearward handle members 52, 54 are spaced from each other and provide an opening or void 62 between the handle members and the container and nozzle assembly that is sufficiently dimensioned to enable the fingers of a user of the apparatus to be inserted into the void 62 when gripping either the forward 52 or rearward 54 handle members of the container or when gripping the nozzle assembly 14. In alternate embodiments of the invention, the handle members can be eliminated with the container extending up to and being attached directly to the nozzle assembly. In such an embodiment, either the container or the nozzle assembly themselves are used as handles for the apparatus.

As stated earlier, the nozzle assembly 14 is connected unitarily to the container 12. In the illustrated embodiment of the invention, the nozzle assembly includes a fluid inlet end 72 and a fluid outlet end 74, and top and bottom walls 76, 78 and left and right sidewalls 82, 84 extending between the inlet and outlet ends. A fluid conducting channel 86 extends through the interior of the nozzle assembly 14 between the inlet and outlet ends 72, 74. In the illustrated embodiment of the invention, the top and bottom walls 76, 78 and the left and right sidewalls 82, 84 surrounding the fluid conducting channel 86 are connected in a general rectangular, tubular configuration giving the channel a rectangular cross section. However, the nozzle assembly may be given other configurations including a cylindrical configuration.

A cylindrical connector 92 is provided at the inlet end 72 of the nozzle assembly. The connector 92 contains an annular sealing ring 93 and is formed with internal screw threads 94 for attaching the inlet end 72 of the nozzle assembly to a hose fitting having complementary screw threads. The connector 92 may be given a variety of configurations for attaching the apparatus 10 to a variety of different sources of fluid and may also be provided with means for connecting the connector 92 to a source of fluid (not shown) other than the internal screw threads 94 shown.

A stopcock valve assembly 96 may also be provided at the inlet end 72 of the nozzle assembly. The stopcock valve assembly includes a ball valve 98 secured for rotation in a spherical seat inside the fluid conducting channel 86 of the nozzle assembly. The ball valve 98 is provided with a fluid conduit 102 extending through its interior. A pivot post 104 extends transversely from the exterior of the ball valve 98 through the left sidewall 82 of the valve assembly and is connected to an operating lever 106 at the exterior of the valve assembly 96. In the position of the manual lever 106 shown in the drawing figures with the lever extending in a vertical direction, the ball valve 96 is in an open position providing full fluid flow through the nozzle assembly from the connector 92 to the fluid conducting channel 86 of the assembly. It should be apparent that by rotating the manual lever 106 90° from the position shown in the drawing figures until the lever is positioned horizontally, the conduit 102 of the ball valve 98 will rotate to its completely closed position. Varying the orientation of the manual lever 106 between the fully open, vertical orientation and the fully closed, horizontal orientation varies the rate of fluid flow through the ball valve 98 to the fluid conducting channel 86 of the nozzle assembly. In a variant embodiment of the invention the nozzle assembly may be constructed without a stopcock valve assembly, with the rate of fluid flow through the nozzle assembly being controlled at the source of the fluid.

As seen in FIG. 4, as the fluid conducting channel 86 of the nozzle assembly extends in a downstream direction, from right to left as viewed in the drawing figures, from the inlet end 72 of the assembly to the outlet end 74, a portion 112 of the assembly top wall 76 tapers downward and converges toward the assembly bottom wall 78. At the position of the top wall portion 112 where it is positioned closest to the nozzle assembly bottom wall 78, it is still positioned slightly above the bottom wall and forms an orifice 114 in the fluid conducting channel 86 of the nozzle assembly. From the position of the top wall portion 112 where it forms the orifice 114 in the channel 86, a second portion of the top wall 116 then diverges upward away from the bottom wall 78 of the nozzle assembly as it extends downstream from the orifice 114. In the illustrated embodiment shown, the indentation in the top wall has a V-shape forming the channel orifice. However, the indentation may have other configurations extending into the channel to form the orifice, such as a semi-circular shape. Alternatively, a single, flat partition may be inserted through the nozzle sidewall and into the channel as the nozzle is molded to form the restriction to flow and the orifice in the nozzle channel.

A port opening 118 is provided through the nozzle assembly bottom wall 78 just downstream of the orifice 114 formed in the nozzle assembly channel 86. The port opening 118 extends downward through the nozzle assembly bottom wall 78 into the interior volume 56 of the forward most container handle member 52. The port opening 118 provides fluid communication between the fluid conducting channel 86 of the nozzle assembly and the interior volume 42 of the container through the hollow interior 56 of the forward most handle member 52. In embodiments of the invention that do not include the handle members, the port opening extends through the nozzle assembly bottom wall directly into the interior of the container. The port opening is dimensioned large enough to enable particles such as seed to pass through the opening. The position of the port opening relative to the orifice enables the top wall portion 112 to deflect a portion of the fluid flow in the nozzle channel downward through the port 118 and into the container. By adjusting the position of the port 118 relative to the top wall portion, the amount of fluid deflected into the container can be adjusted.

As the channel extends downstream of the port opening 118, a portion 122 of the nozzle assembly bottom wall 78 between the orifice and the outlet end 74 of the nozzle assembly angles slightly upward. This substantially flat, angled portion 122 of the nozzle assembly bottom wall enables the fluid exiting the channel 86 of the nozzle assembly to be dispensed in a spray configuration from the nozzle assembly. In a like manner, the sidewalls at the outlet end of the nozzle may be angled to direct the spray from the nozzle in a variety of patterns.

In use of the apparatus of the invention 10 described above, the container cap 44 is first removed from the container opening 38 and a supply of material 126 to be dispensed by the apparatus is placed in the container interior volume 42. The cap 44 is then screw threaded over the container opening 38. Next, the nozzle assembly connector 92 is screw threaded onto a source of fluid pressure. Depending on the type of materials 126 to be dispensed by the apparatus, the source of fluid pressure may be a liquid when dispensing materials such as grass seed or fertilizer, or may be compressed air when dispensing materials such as insecticide powder. The source of fluid pressure to the apparatus is then activated and the flow of fluid through the nozzle assembly channel 86 may then be regulated by manually adjusting the lever 106 of the stopcock valve assembly 96 or by adjusting the rate of flow of fluid at its source if the apparatus does not employ a stopcock valve.

As pressurized fluid passes through the channel 86 of the nozzle assembly, the converging portion 112 of the assembly top wall forces a portion of the fluid down into the container interior 42 through the port opening 118 and the hollow interior 56 of the forward most handle member 52. The fluid forced down into the container interior 42 mixes with the material 126 to be dispensed contained in the container, and together the fluid and mixed material rise in the container interior up to the port opening 118. As the material 126 mixed with the fluid rises up through the port opening 118 it mixes with the remainder of the fluid passing through the nozzle assembly channel 86 downstream of the orifice 114 and together the material and fluid are sprayed out the outlet end 74 of the nozzle assembly over the angular portion 122 of the nozzle assembly bottom wall. By adjusting the manual lever 106 of the stopcock valve assembly 98, or by adjusting the rate of flow at the source of fluid, the rate that the material and fluid are dispensed from the outlet end 74 of the nozzle assembly may be varied.

In operation of the apparatus 10, the converging portion 112 of the top wall performs a dual function, both deflecting a portion of the fluid passing through the channel 86 down through the port opening 118 and into the container interior 42, and also accelerating the flow of fluid at the orifice 114 producing a pressure difference in the flow of fluid over the port opening 118 that causes the mixture of both fluid and material in the container interior 42 to be drawn out of the container through the port opening 118 and into the flow of fluid passing over the port opening.

In constructing the apparatus of the invention, the converging portion 112 of the nozzle assembly and the orifice 114 formed by the converging portion may be positioned further downstream toward the port opening 118 than shown in the drawing figures. As the orifice 114 is positioned closer to the port opening, increasing amounts of fluid are deflected downward through the port opening 118 into the container interior thereby causing increased amounts of the material 126 to be stirred up into the mixture of material and fluid in the container. In the extreme repositioning of the converging portion 112 and the orifice 114, the orifice is positioned directly over the port opening 118 where it directs the maximum amount of flow into the container interior 42 creating the maximum amount of turbulence in the fluid in the container and thereby causing the maximum amount of the materials 126 to be mixed with the fluid in the container. In this manner, the apparatus of the invention can be specifically designed to produce the desired mixture of the material 126 in the flow of fluid dispensed from the apparatus.

The cellular depressions formed by the plurality of ridges 28 and troughs 32 in the bottom wall 16 of the container also regulate the amount of material 126 that is mixed with the fluid passed into the container interior 42 through the port opening 118. The ridges and troughs prevent the entire supply of material 126 from being mixed in the fluid as it circulates in the container interior 42. If it is desired to dispense higher concentrations of the material 126 in the fluid from the apparatus, the user need only rotate the entire apparatus about the center axis of the nozzle channel 86 to cause the material 126 to spill out from the troughs 32 formed in the container bottom wall and mix in a higher concentration in the fluid circulating in the container interior.

When the material 126 is completely dispensed from the container interior, the operator need only close the stopcock valve 96 or stop the fluid at its source, and remove the container cap 44 to replenish the supply of material 126 in the container interior. Unlike prior art mixing and spraying devices, there is no need to detach the container from the nozzle assembly to replenish the supply of material 126 in the container interior.

Figure 5:
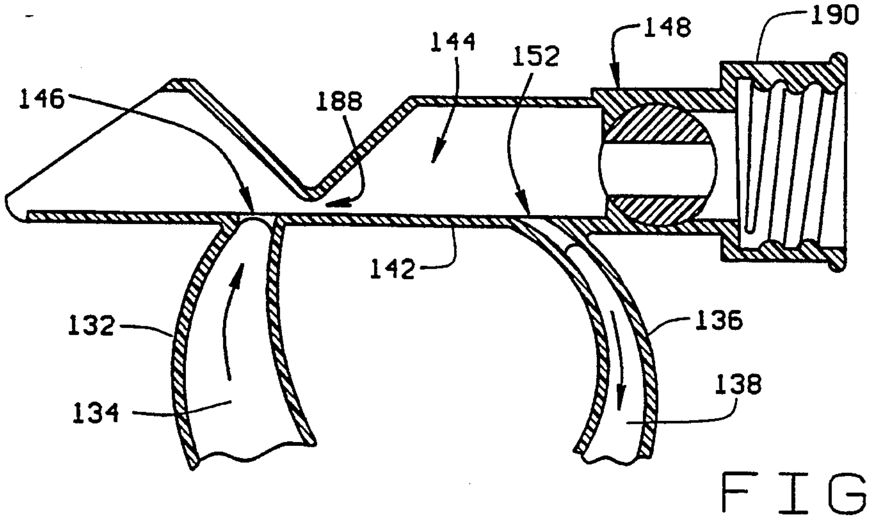
FIG. 5 shows a partial side elevation view, in section, of the second embodiment of the apparatus; and, FIG. 6 shows a partial side elevation view, in section, of a third embodiment of the invention.

FIG. 5 shows a variant embodiment of the apparatus of the invention that is similar to the first described embodiment except for the details of the connection of the rearward most handle member to the underside of the nozzle assembly. As seen in FIG. 5, this embodiment of the invention is also comprised of a container (not shown) similar to the first described container and having a forward handle member 132 with a hollow interior 134 and a rearward handle member 136 with a hollow interior 138. The top most ends of the handle members 132, 136 are connected unitarily to the bottom wall 142 of the nozzle assembly. The interior 134 of the forward handle member 132 communicates with the fluid conducting channel 144 of the nozzle assembly through a left side port opening 146 (as viewed in FIG. 5) in substantially the same manner as the first described embodiment of the invention. The left port opening 146 communicating the channel interior 144 with the forward handle member interior 134 is positioned downstream of the nozzle assembly orifice 188 in the same manner as the first embodiment of the invention.

The second embodiment of the invention shown in FIG. 5 differs from the first described embodiment in that the rearward handle member 136 connects unitarily with the underside or bottom wall 142 of the nozzle assembly at a position slightly downstream of the stopcock valve assembly 148 or at a position slightly downstream of the connector 190 if a stopcock valve is not employed. As seen in FIG. 5, a second, right side port opening 152 (as viewed in FIG. 5) extends through the nozzle assembly bottom wall 142 and communicates the fluid conducting channel 144 with the interior volume of the container (not shown) through the hollow interior 138 of the rearward handle member 136. By positioning the right port opening 152 upstream of the orifice 188 and the left port opening 146, a portion of the fluid conducted through the nozzle channel 144 passes through the right port opening 152 and down into the container interior where it mixes with the material to be dispensed by the apparatus. With the orifice 188 restricting fluid flow through the channel, the fluid on the right or upstream side of the orifice will have a greater pressure than the fluid on the left or downstream side of the orifice. This difference in fluid pressure causes fluid to pass down through the right port 152 and into the container. The right port opening is generally smaller than the left port opening to prevent seeds or other particles mixed with the fluid from passing up through the right port opening with the fluid. It is also desirable to have the left port opening larger than the right port opening to prevent excess fluid pressure from building up in the container to point where it could possibly burst the container.

In both embodiments of the invention disclosed, the position of the nozzle top wall portion 112 relative to the left port opening may be varied to adjust an amount of fluid flow directed down the left port by the wall portion. In the embodiment of FIG. 5, the position of the top wall portion relative to the left port could be adjusted so that fluid only enters the container through the right port, and only exits the container through the left port. The size of the left and right ports may also be varied to adjust the rates of fluid flow into and out of the container.

The remainder of the second embodiment of the apparatus of the invention is similar to that of the first described embodiment and the functioning of the second embodiment of the invention, apart from a portion of the fluid passing through the right port 152 into the container interior to mix with the material to be dispensed, remains substantially identical to that of the first embodiment of the invention.

Figure 6:
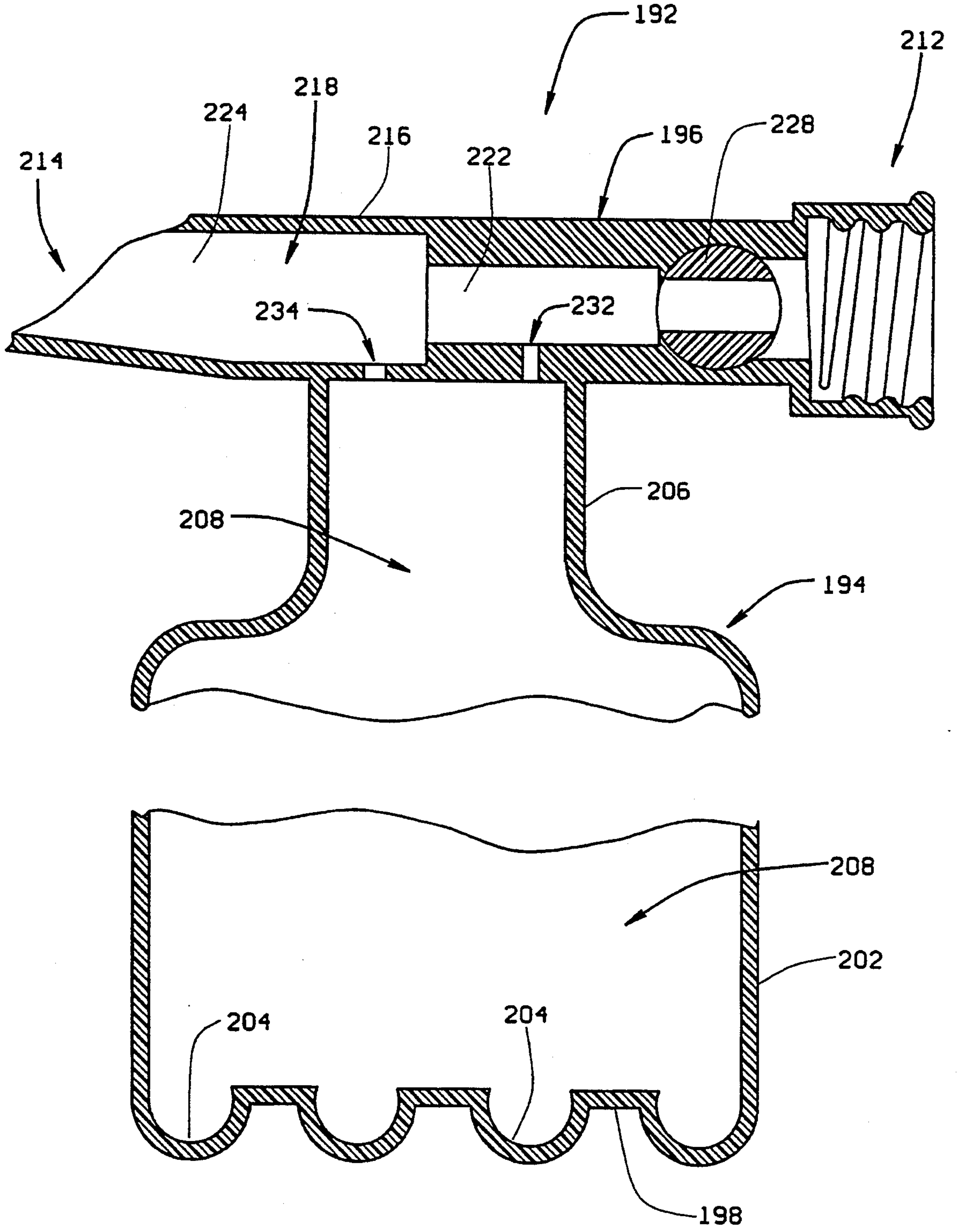

In the embodiment of the invention which does not have handle members, the container is formed unitarily with the nozzle and the left and right port openings pass through the bottom wall of the nozzle directly into the container. FIG. 6 shows such an embodiment of the mixing and dispensing sprayer apparatus 192 of the present invention. As seen in the drawing figure, this embodiment of the apparatus is generally constructed of a hollow container 194 and a nozzle assembly 196. This embodiment of the invention differs from previously described embodiments in that the nozzle assembly 196 is molded directly to the container 194 and the apparatus does not employ handle members.

The container 194 is formed with a bottom wall 198 and a cylindrical sidewall 202. Although the container is shown as having a general cylindrical configuration, like the previously described embodiments of the invention, the container may have a variety of configurations other than those described and shown in the drawing figures. The container bottom wall 198 is formed with a plurality of cellular depressions that are defined by semi-circular recesses 204. The recessed cells 204 are arranged in the bottom wall 198 of the container in a random pattern. If so desired, the cells may also be provided in the sidewall 202 of the container. Again, as in the previously described embodiments of the invention, the cells 204 may have a variety of different configurations and may be arranged in a variety of different patterns in the bottom wall and/or sidewall of the container without departing from the intended scope of the invention as defined by the claims.

Although not shown in drawing FIG. 6, the container 194 is provided with an access opening. The access opening may be positioned anywhere on the container, including the bottom wall 198 of the container. As in the previously described embodiments, the container access opening is provided with some type of closure (not shown) for selectively opening and closing the access opening to gain access to the interior volume 208 of the container and seal the interior volume. Where the access opening is positioned at the top of the container neck 206, the nozzle assembly 196 can be formed as an integral part of the closure member so that removing the closure member from the access opening of the container detaches the nozzle assembly 196 from the container 194, and replacing the closure member on the container reattaches the nozzle assembly to the container.

In the embodiment of the invention shown in FIG. 6, the nozzle assembly 196 is molded as a single unit with the container 194. The nozzle assembly includes a fluid inlet end 212 and a fluid outlet end 214, and a cylindrical sidewall 216 extending between the inlet and outlet ends giving the nozzle assembly 196 a generally tubular configuration. A fluid conducting channel 218 extends through the interior of the nozzle assembly between the inlet and outlet ends. The channel 218 is formed having two coaxial sections 222, 224, with the upstream or right hand section 222 as viewed in FIG. 6 having a smaller diameter and cross-sectional area than the downstream or left hand section 224.

A connector 226 is provided at the inlet end 212 of the nozzle assembly. The connector 226 is similar to the connectors of the previously described embodiments of the invention. Like the previously described embodiments of the invention, the connector 226 may be given a variety of configurations for attaching the apparatus 192 to a variety of different sources of fluid.

A stopcock valve assembly 228 may also be provided at the inlet end 212 of the nozzle assembly as shown in FIG. 6. The stopcock assembly 228 is similar to that employed in the previously described embodiments of the invention. If so desired, the stopcock valve assembly 228 may be eliminated from the embodiment of the invention of FIG. 6, with the rate of fluid flow through the channel 218 of the nozzle assembly being regulated at the source of fluid supplied to the apparatus.

As seen in FIG. 6, as the fluid conducting channel 218 of the nozzle assembly extends in a downstream direction, from right to left as viewed in FIG. 6, from the inlet end 212 of the assembly to the outlet end 214, the fluid first passes through the right side section 222 of the channel having the smaller internal diameter than the second section 224 of the channel. An upstream or right hand port opening 232 is provided through a bottom wall of the nozzle assembly 196 communicating the interior of the channel upstream section 222 with the interior volume 208 of the container. As the channel extends downstream from the first channel section 222, the diameter of the channel increases as it enters the downstream, second channel section 224. A downstream or a left side port opening 234 is provided through the bottom of the nozzle assembly sidewall 216 communicating the interior volume of the downstream channel section 224 with the interior volume 208 of the container. As in the previously described embodiments of the invention, the downstream port opening 234 is usually larger than the upstream port opening 232 to prevent excessive pressure from building up inside the container 194 that could possibly burst the container. The dimensions of the downstream port opening 234 are also usually large enough to enable seeds and other large particulate material to pass through the port opening 234 to enable the apparatus of FIG. 6 to dispense such materials. By varying the relative sizes of the downstream and upstream port openings 234, 232, the rate of fluid flow supplied to the interior of the container 208 and exiting the container interior through the port openings may be adjusted.

Because the upstream or first channel section 222 has a smaller internal diameter than the downstream or second channel section 224, and because the downstream channel section 224 communicates with the atmosphere through the nozzle outlet 214, fluid flowing through the upstream channel section 222 will have a slightly greater pressure than the fluid passing through the downstream channel section 224. This greater fluid pressure causes a portion of the fluid to be forced downward through the upstream or right side port opening 232 and into the container interior 208. The fluid passed into the container interior 208 fills the container and mixes with the material to be dispensed (not shown) in the interior of the container. As the container fills with the fluid, the fluid passes up through the container neck 206 and exits the container through the downstream or left side port opening 234. The fluid mixed with the material to be dispensed by the apparatus exits the container through the downstream or left side port opening 234 and mixes with the remainder of the fluid passing through the nozzle channel 218 and is dispensed from the outlet end 214 of the nozzle assembly. By adjusting the stopcock valve 228, or by adjusting the rate of fluid flow at the source of fluid, the rate that the material and fluid are dispensed from the outlet end 214 of the nozzle assembly may be varied. As in the first described embodiments of the invention, the cellular depressions 204 formed in the bottom wall of the container also regulate the amount of material that is mixed with the fluid passing through the container interior 208. The cellular depressions prevent the entire supply of material from being mixed in the fluid as it circulates in the container interior. If it is desired to dispense higher concentrations of the material in the fluid from the apparatus, the user need only rotate the entire apparatus about the center axis of the nozzle channel to cause the material to spill out from the cellular depressions 204 and mix in higher concentrations with the fluid circulating in the container interior.

The apparatus of the invention handles all liquids, powders, slurries, suspensions, whether soluble in water, oil or other solvents, granules of every shape and density, rocks, gravel, soil, mulch, fibers and the like, by size of the exit orifice, amount of agitation, and by rotating the apparatus to any desired use positioned from normal to inverted through 360°. The accommodations of the apparatus described above give almost infinite variations in the kinds and amounts of materials for which the apparatus may be used realizing that the apparatus can be manufactured in all sizes and contours for any specific use, as with fixed orifices and dimensions, or as a multiple use apparatus by constructing the apparatus with variable and easily adjustable settings.

The unique configuration of the mixing and dispensing sprayer apparatus of the present invention enables it to be formed as a single unit in a blow molding process. This enables the apparatus of the invention to be produced much more inexpensively than other prior art mixing and dispensing apparatus formed by an injection molding process or other processes. The tooling costs involved in blow molding are typically less than those involved in injection molding of plastics. Blow molding enables the apparatus of the invention to be formed with thinner wall thicknesses where desired and out of varies blow moldable plastics, metals, glasses, ceramics, or any other type of material that can be blow molded, resulting in a lesser amount of the material used in forming the apparatus than would typically be possible. For example, by blow molding, the container of the apparatus could be formed with the wall thickness of a flexible, collapsible plastic bag. By releasably attaching the bag to the nozzle assembly it could be disposed of and replaced after each use. The blow molding process is a much more simplified process than is injection molding, enabling more units of the apparatus of the invention to be molded per unit time than would be possible with an injection molding process. All of these beneficial features of the blow molding process enable the apparatus of the invention to be produced more quickly and at less expense than is typically possible in injection molding techniques.

To form the apparatus of the invention 10 by blow molding, a mold for the apparatus is first constructed. The method of forming molds for blow molding is conventional and is not described here in great detail. The mold is basically comprised of at least a pair of mold halves 162, 164 represented by the blocks drawn in dashed lines in FIG. 3. Each of the mold halves is formed with mutually opposed face surfaces that meet along the dividing line 166 of the mold halves. The opposed surfaces have recesses formed therein, with the recesses of the respective mold halves 162, 164 being configured to form the left and right half sides of the apparatus of the invention 10 except for the opening cap 44 and seal 46 of the container, and the ball valve 98 (when a stopcock valve is to be employed in the apparatus) and the seal 93 of the nozzle assembly. In forming the apparatus 10, the mold halves 162, 164 are spaced apart from each other and a hollow cylindrical tube of molten plastic or parison of molten plastic is positioned between the spaced mold halves. The mold halves then come together, pressing the parison into the recesses of the two mold halves. A blow tube (not shown) is connected to the mold to supply air to the interior of the parison. Compressed air is then passed through the blow tube into the softened parison material causing it to expand into the pattern of the mutually opposed recesses of the two mold halves. As the parison expands, a thin layer of plastic coats the surfaces of the mold half recesses and forms the sidewalls of the nozzle assembly 14 and container 12 of the apparatus 10.

Once the parison is completely inflated forming the plastic sidewalls of the container and nozzle assembly of the apparatus, the plastic material is permitted to cool to form its new shape before being removed from the two mold halves. After the plastic material has been removed from the two mold halves, a layer of material covering the access opening 38 to the container interior is cut away to form the opening, and a layer of material is cut away from the outlet end 74 of the nozzle assembly forming the exit opening at the outlet end. A layer of material is cut away from the inlet end 72, and any excess flash is cut away from the open void 62 of the molded apparatus. If a valve is desired to shut off or regulate the fluid flow through the apparatus, the ball valve 98 is assembled into the interior of the nozzle assembly channel 86. The annular seals 46, 93 and the opening cap 44 are assembled to the apparatus to complete its construction. All of the embodiments of the invention are blow molded in substantially the same manner, and the ball valve, seals and cap of the second embodiment of the invention are assembled to the apparatus in the same manner as in the first embodiment. Although the blow molding process is preferred in forming the apparatus of the invention in order to reduce the costs involved in producing the apparatus, it should be understood that the novel configuration of the apparatus also enables it to be formed by other known methods of producing plastic molded products and from many other materials.

While the present invention has been described by reference to specific embodiments, it should be understood that modifications and variations of the invention may be constructed without departing from the scope of the invention defined in the following claims.

What is claimed is:

1. An apparatus for mixing a material into a flow of fluid conducted through the apparatus and for dispensing the material with the fluid from the apparatus, the apparatus comprising:

a container having at least one wall enclosing an interior volume for containing a material to be dispensed with a flow of fluid from the apparatus; and, a nozzle assembly connected with the container as a single unit, the nozzle assembly having opposite first and second ends, a fluid conducting channel extending through an interior of the nozzle assembly between the first and second ends, a port opening through the container wall from the fluid conducting channel providing fluid communication between the fluid conducting channel and the container interior volume, and an indentation extending into the fluid conducting channel on an opposite side of the channel from the port for directing a portion of fluid flow conducted through the channel between the nozzle first and second ends out of the channel and through the port opening into the container interior volume while permitting a remaining portion of the fluid flow to continue to flow toward the nozzle second end.

2. The apparatus of claim 1, wherein:

the container and the nozzle assembly are connected as a single unit by having been blow molded together as a single unit.

3. The apparatus of claim 1, wherein:

the nozzle assembly has at least one sidewall containing the fluid conducting channel and extends in a downstream direction along an axial length of the channel from the first end of the nozzle assembly to the second end of the nozzle assembly, and the indentation includes a first portion of the sidewall that converges toward a second portion of the sidewall, opposite the first portion, as the sidewall extends downstream along the axial length of the channel, thereby forming an orifice in the channel between the first and second sidewall portions.

4. The apparatus of claim 3, wherein:

the first portion of the sidewall diverges away from the second portion of the sidewall as the sidewall extends downstream along the axial length of the channel from the orifice in the channel.

5. The apparatus of claim 1, wherein:

the nozzle assembly has four sidewalls that together surround the fluid conducting channel and give the channel a general rectangular cross section configuration, the indentation includes one of the sidewalls the converges toward a second sidewall opposite the one sidewall as the one and the second sidewalls extend in a downstream direction along the channel from the first end of the nozzle assembly toward the second end of the nozzle assembly, the convergence of the one sidewall toward the second sidewall forming an orifice in the channel.

6. The apparatus of claim 5, wherein:
the one sidewall diverges away from the second sidewall as the channel extends downstream from the orifice formed in the channel.

7. The apparatus of claim 1, wherein:
the container is formed with a pair of handle members that project from the container and are connected unitarily with the nozzle assembly, the pair of handle members are spaced from each other forming a void between the two handle members, the void providing access for insertion of fingers of a user of the apparatus when gripping the nozzle assembly or one of the two handle members.

8. The apparatus of claim 7, wherein:
one handle member of the pair of handle members has a hollow interior that communicates with the interior volume of the container and communicates through the port with the channel of the nozzle assembly.

9. The apparatus of claim 7, wherein:
a pair of separate ports provide fluid communication between the fluid conducting channel and the container interior volume and each handle member of the pair of handle members has a hollow interior that communicates with the interior volume of the container and communicates through one of the pair of ports with the channel of the nozzle assembly.

10. The apparatus of claim 1, wherein:
the nozzle assembly has at least one sidewall containing the fluid conducting channel and extends in a downstream direction along an axial length of the channel from the first end of the nozzle assembly to the second end of the nozzle assembly, the fluid conducting channel includes an upstream section and a downstream section with the upstream section having a smaller cross-sectional area than the downstream section, and the port extends through the sidewall from the downstream section of the channel to the container interior volume.

11. The apparatus of claim 10, wherein:
a second port provides fluid communication between the fluid conducting channel and the container interior volume, the second port extends through the sidewall from the upstream section of the channel to the container interior volume.

12. An apparatus for mixing a material into a flow of fluid conducted through the apparatus and for dispensing the material with the fluid from the apparatus, the apparatus comprising:
a container having at least one sidewall enclosing an interior volume for containing a material to be dispensed with a flow of fluid from the apparatus; and
a nozzle assembly connected to the container, the nozzle assembly having opposite first and second ends, a fluid conducting channel extending through the nozzle assembly between the first and second ends, a port opening through the container wall from the fluid conducting channel providing fluid communication between the fluid conducting channel and the container interior volume, and at least one sidewall containing the fluid conducting channel, the sidewall extending in a downstream direction along an axial length of the channel from the first end of the nozzle assembly to the second end of the nozzle assembly, the sidewall having a first portion and a second portion positioned opposite the first portion, and the first portion of the sidewall converges toward the second portion of the sidewall as the sidewall extends downstream from the first end to the second end of the nozzle assembly thereby forming an orifice in the fluid conducting channel between the first and second sidewall portions for deflecting a portion of fluid flow conducted through the channel between the nozzle first and second ends out of the channel and through the port opening into the container interior volume while permitting a remaining portion of the fluid flow to continue to flow toward the nozzle second end.

13. The apparatus of claim 12, wherein:
the first portion of the sidewall diverges away from the second portion of the sidewall as the sidewall extends downstream from the orifice formed in the fluid conducting channel to the second end of the nozzle assembly.

14. The apparatus of claim 12, wherein:
the nozzle assembly has four sidewalls that together surround the fluid conducting channel, the four sidewalls are connected together in a rectangular configuration and give the fluid conducting channel a rectangular cross section configuration, and one of the sidewalls converges toward a second sidewall opposite the one sidewall as the one and second sidewalls extend in the downstream direction along the channel from the first end of the nozzle assembly toward the second end of the nozzle assembly, the convergence of the one sidewall toward the second sidewall forming an orifice in the channel.

15. The apparatus of claim 14, wherein:
the one sidewall diverges away from the second sidewall as the channel extends in the downstream direction from the orifice toward the second end of the nozzle assembly.

16. The apparatus of claim 14, wherein:
the second sidewall is substantially flat and inclines toward the first sidewall as the channel extends in the downstream direction from the orifice toward the second end of the nozzle assembly.

17. An apparatus for mixing a material into a flow of fluid conducted through the apparatus and for dispensing the material with the fluid from the apparatus, the apparatus comprising:
a nozzle assembly having opposite first and second ends, a fluid conducting channel extending through the nozzle assembly between the first and second ends, at least one sidewall containing the fluid conducting channel, the sidewall extending in a downstream direction along a length of the channel between the first end of the nozzle assembly and the second end of the nozzle assembly, a port opening through the sidewall and an indentation extending into the fluid conducting channel on an opposite side of the channel from the port for directing a portion of a fluid flow through the channel out of the channel and through the port opening; and
a container having an interior volume for containing a material to be dispensed with a flow of fluid from the apparatus, the container having a pair of separate handle members that project upwardly from the container and are connected to the nozzle assembly at a top of the container, the pair of handle members are spaced from each other forming a void between the handle members and between the container and the nozzle assembly, where the void is sufficiently dimensioned to enable insertion of fingers of a hand of a user of the apparatus into the void when gripping the nozzle assembly or one of the pair of handle members, at least one of the handle members being hollow with an interior volume of the one handle member communicating with the container interior volume at the top of the container so that when a flow of fluid is conducted through the apparatus and a portion of the fluid is directed into the container the fluid first rises in the container interior volume and then enters and rises in the interior volume of the one handle member from the top of the container interior volume.

18. The apparatus of claim 17, wherein:

each handle member of the pair of handle members has a hollow interior that communicates with the interior volume of the container, a pair of port openings are provided through the sidewall of the nozzle assembly, and the pair of port openings extend between the fluid conducting channel of the nozzle assembly and the hollow interiors of the pair of handle members and provide fluid communication between the fluid conducting channel and the hollow interiors of the pair of handle members.

19. An apparatus for mixing a material into a flow of fluid conducted through the apparatus and for dispensing the material with the fluid from the apparatus, the apparatus comprising:

a nozzle assembly having opposite first and second ends, a fluid conducting channel extending through the nozzle assembly between the first and second ends, and at least one sidewall containing the fluid conducting channel, the sidewall extending in a downstream direction along a length of the channel between the first end of the nozzle assembly and the second end of the nozzle assembly; and, a container connected to the nozzle assembly, as a single unit the container having an interior volume for containing a material to be dispensed with a flow of fluid from the apparatus, the container having at least one wall containing the interior volume of the container, the nozzle assembly is connected to the container overlaying one portion of the container wall and an access opening is provided in an other portion of the container wall providing access to the container interior volume through the access opening, where the access opening is positioned on the other portion of the container wall separated from the nozzle assembly connected to the one portion of the container wall and where the nozzle assembly does not overlay the access opening.

20. The apparatus of claim 19, wherein:

a removable cap is provided on the access opening for selectively opening and closing the access opening, the cap is removable from the access opening to provide access to the container interior volume from outside the container while the nozzle assembly remains connected to the container.

21. The apparatus of claim 19, wherein:

the container wall has an interior surface within the interior volume of the container, and the interior surface has a plurality of cellular depressions formed therein to control mixing of a material contained in the container with a fluid conducted through the container interior by the apparatus.

22. The apparatus of claim 21, wherein:

the container has a pair of separate handle members that project upwardly from the container and are connected to the nozzle assembly where a portion of the nozzle assembly extending between the handle members and the handle members define a handle of the apparatus, and an open void for insertion of a user's hand therein is surrounded by the portion of the nozzle assembly, the two handle members, and the one portion of the container wall extending between the two handle members, and the access opening into the container is provided through the other portion of the container wall remote from the one portion of the container wall extending between the two handle members thereby preventing the handle from interfering with access to the container access opening.

* * * * *